3,000,787
HEPARINOID ANTICHOLESTROLEMIC FACTOR
Pietro Bianchini, Milan, Italy, assignor to Crinos Industria Farmacobiologica S.p.A., Milan, Italy
No Drawing. Filed Nov. 4, 1958, Ser. No. 771,768
Claims priority, application Great Britain Nov. 6, 1957
3 Claims. (Cl. 167—74)

This invention is concerned with a new chemical compound or composition of matter of use in therapy.

The use of heparin in the prophylaxis and therapy of atherosclerotic diseases, based on its particular action in normalizing the lipoprotidemic condition and the relation between alpha- and beta-globulins, has certain marked disadvantages for several reasons.

Firstly as heparin has an anticoagulant action prolonged treatment with this drug must take place under constant observation of coagulation time to prevent haemorrhage. It cannot be given satisfactorily by intravenous injections, because this causes large haemotoma at the site of injection, nor can it be taken orally because of instability. Heparin is also destroyed or inactivated by digestive enzymes in particular hepatic heparinase.

For these reasons the administration of heparin is limited to the intravenous, subcutaneous or perlingual routes and has to take place with control of the coagulation time.

I have now isolated a new compound or composition of matter which we shall for convenience refer to as "ateroid" which has certain marked advantages over heparin.

Thus whilst ateroid is in some aspects similar to heparin it has substantially no anticoagulant effect at therapeutic doses of administration, is active against lipoprotidemia when given either orally or parenterally, and has a strong hypocholesterolemic activity. It is therefore useful in the treatment of conditions in which there is an alteration in the lipoid/protein metabolism.

According to the invention therefore I provide as a new compound or composition of matter ateroid having the characteristics substantially as herein set forth.

From our present knowledge ateroid appears to be a heparinoidic factor probably of an aminopolysaccharide (or glycoproteic) nature, which has a metachromatic reaction with toluidine blue. Other characteristics of ateroid will appear hereinafter. It can in general be extracted from the small intestine and in particular the duodenum of animals for example oxen, pigs, horses or sheep by methods adapted for the isolation of aminopolysaccharidic or glycoproteic compounds. Thus, a suitable method consists in subjecting the animal organ to successive alkaline and acid extraction treatments combined with autolysis and/or proteolysis steps if desired. The ateroid obtained by such a method may be subjected to further purification by any suitable method. Thus, for example, purification may be effected by further acid and/or alkaline extractions, dialysis and like procedures, or may be effected by treatment with phenol as hereinafter described.

A method for the isolation of ateroid will now be described by way of example only:

A quantity (for example 50 kg.) of cleaned and ground duodenum of a pig are suspended in water (for example 150 litres) containing 0.5% HCl (about 750 ml. HCl for 150 litres).

The mass is then homogenized, for example in a colloidal mill, until the ground duodenum is entirely transformed into a paste.

This substance is then transferred into an extractor, in which it is brought to the boil with mixing the temperature being kept for a few minutes (e.g. 5 minutes) at about 100° C.

After cooling the mixture is neutralized for example with NaOH to a pH about 6.8–7.0 and allowed to stand for a period of about 2 hours. The mixture is then acidified for example with acetic acid, to a pH of about 5.0.

The liquid phase is then separated from the solid residue in a hydroextractor or similar equipment and discarded. It is advantageous to dry the solid residue in a vacuum oven.

The weight of the dried material from 50 kg. of duodenum is about 7–8 kg.

The dried material is then ground and, if it is very fatty, treated to remove the fat therefrom. It is then suspended in water at pH 8 and the suspension heated for about 15 minutes at a temperature of from 70–90° C., to effect hydrolysis and/or autolysis of the material. The suspension is then filtered hot and the filtrate collected. The solid residue from this filtration step is re-extracted with water and subjected to hydrolysis and/or autolysis and filtration, the filtrate being combined with the filtrate from the initial extraction. The combined filtrates may then be treated with proteases, such as trypsin, papain and the like to effect proteolysis of the material if desired and the liquid is then concentrated to about ¼ of its original volume and subjected to dialysis. The dialysis may be effected using a cellophane bag and dialysing at the rate of two litres of liquid every 24 hours. The dialysed material is then filtered, and the solid residue is discarded. To the dialysate is then added 1¼ its own volume of acetone with strong agitation, the pH of the mixture being adjusted to pH 5 by the addition of acetic acid. The precipitate which forms, which is crude ateroid, is dried with alcohol and ether. The yield is about 0.16% of the fresh animal organ.

Two methods for the purification of ateroid will now be given by way of illustration only:

METHOD I

About 1 kg. pulverized crude ateroid is dissolved in about 20 litres of aqueous sodium hydroxide (pH=8) and the mass heated to 70° C. on a water-bath. It is then filtered and the clear filtrate is precipitated with about 5 volumes of 95% alcohol and acidified to a pH=5.5–6.0, for example with HCl.

After 12 hours the liquid is decanted and the precipitate, weighing about 250 g. is once more dissolved in aqueous sodium hydroxide. The resulting solution is gold-yellow.

The quantity of aqueous sodium hydroxide to be added depends on the solubility of the material, which may vary from batch to batch. It is added slowly, till complete solution.

After acidification to a pH=5 a solution containing 2.5% cadmium chloride is added. The mass is heated to 70° C. and filtered.

The liquid containing an excess of cadmium is treated with a current of hydrogen sulphide in order to precipitate the cadmium in form of its sulphide. The excess hydrogen sulphide is expelled by heating. 2–3 volumes of acetone are added to the clear solution and after 12 hours the liquid is decanted from the precipitate which forms. The precipitate is then dried with alcohol and ether and is finally dried under vacuum.

The resulting mass, weighing about 50 g., is a white or ivory-white powder of purified ateroid.

METHOD II

Ateroid may also be purified by treatment with phenol for example as described below.

Crude ateroid, obtained as described above is suspended in 90% phenol (5% w./v.), shaken for 48 hours and centrifuged. Two fractions separate namely a phenol-insoluble fraction and a phenol-soluble fraction. The phenol insoluble fraction is washed with 4–5 volumes of alcohol and triturated in a mortar. It is then washed with ether to yield an ivory-white powder. This is dissolved in water (1:10 parts by volume), dialyzed for 36 hours, precipitated with alcohol (3 volumes, 95%), centrifuged and dried with ether. The product is purified ateroid containing from 60-70% of pure substance.

The phenol soluble fraction is treated with 50% alcohol at 90° C., centrifuged or decanted, washed with alcohol and ether and dried. There results a further quantity of purified ateroid.

Ateroid as isolated from the duodenum of several animals can be further characterised by the following reactions when compared with heparin and like substances.

Metachromatic reaction

The spectrophotometric characteristics of heparin, ateroid and condroitin sulphuric acid (hereinafter referred to as C.S.A.) with toluidine blue (T.B.) using aqueous solutions in a 1 cm. quartz cell and a Beckmann spectrophotometer D.U. were compared. This comparison showed that transmission curves of C.S.A. and ateroid are similar but markedly different from heparin.

The critical micelle point, that is the point at which the substance is saturated with one standard dose of toluidine blue is respectively:

| Heparin | Ateroid | C.S.A. |
| --- | --- | --- |
| 0.400 | 0.455 | 0.450 |

The critical micelle point is expressed as the weight relation between the quantity of substance and the quantity of T.B.

The photodensitometric readings of the metachromatic bands obtained on electrophoretic strips with equal quantities of substance, show comparable areas between one and the other.

Considering the value for heparin expressed in metachromatic units in $\mu g./mg.$ to be 1,000, the values obtained are the following:

| Heparin | Ateroid | C.S.A. |
| --- | --- | --- |
| 1,000 | 424 | 250 |

Electrophoresis

Electrophoretic tests on paper at a pH of 8.6 indicate that the anodic migration rate of heparin is somewhat faster than that of ateroid; this fact indicates that the latter has a smaller net weight per unit of mass.

At a pH=8.6 on a borate pad (680 ml. borate buffer 12,404 g. of boric acid+100 ml. N.NaOH made up to 1000 mls. with water) to which is added 320 ml. 0.1 N HCl, the migration rate "U" of ateroid and heparin is calculated from the formula:

$$U = \frac{d}{t.F}$$

where:

$d$ is the distance in cm. from the starting line,
$F$ is the ratio of difference of the potential in volts to the length of the strip in cms.
$t$ is the time of the run in seconds.

Values found:

Heparin: $U = -6.67.10^{-5}$
Ateroid: $U = -4.44.10^{-5}$

Taking plasma proteins as reference substances heparin migrates more quickly than albumin whilst ateroid has a migration rate lying between alpha$_1$- and alpha$_2$-globulins.

Hexuronic acids content

Ateroid gives a positive reaction with carbazole which indicates the presence of hexuronic acids in the molecule (Dische, Z., J. Biol. Chem. 167, 189 (1947)). This reaction is made with eluates of the electropherograms on paper of a standard ateroid preparation. The values obtained in $\mu g./mg.$ are as follows:

| Heparin | Ateroid | C.S.A. |
| --- | --- | --- |
| 310-335 | 318-382 | 297 |

Hexosamine

The determination of hexosamine by the method of Elson and Morgan, on the eluates of the electropherograms, gave the following values in $\mu g./mg.$:

| Heparin | Ateroid | C.S.A. |
| --- | --- | --- |
| 320 | 243 | 160 |

In addition to the data of a physico-chemical nature such as those of the metachromatic carbazole and hexosamine reactions, biological data has also been obtained using the heparin always as reference substance. This biological data also distinguishes ateroid from other known substances closely similar to heparin.

Antilipemic activity

The antilipemic activity on diverse parameters of lipidemia were examined in relation to heparin taken as reference.

They are:

O.D. of plasma at 600 m$\mu$

In albino rats or 300 g. Long-Evans spots is administered Triton W.R. 1339 (p-isooctylpolyoxyethylenephenol) intravenously in a dose of 200 mg./kg., and at the same time the substance under study intraperitoneally, in a dose of 100 mg./kg.

After 8 hours, 8-10 ml. of citrated blood is withdrawn from the animals by intracardiac puncture.

The optical density at 600 m$\mu$ is determined on the plasma with a Beckmann D.U. spectrophotometer in a 1 cm. cell.

The drop in O.D. is calculated by the formula:

$$\phi \text{ percent} = 100 - \frac{E-C}{T-C} \times 100$$

where:

$\phi$ = percent drop
$E$ = average value of the batch treated with Triton and ateroid (100 mg./kg.)
$C$ = average value of the control batch
$T$ = average value of the batch treated only with Triton The results are the following:

|  | Controls | Triton 200 mg./kg. | Heparin 100 mg./kg. | Ateroid 100 mg./kg. |
| --- | --- | --- | --- | --- |
| O.D. 600 m$\mu$ | 0.163 | 0.546 | 0.262 | 0.172 |
| O.D. percent | 100.000 | 335.000 | 161.000 | 106.000 |
| Percent drop relative to control | 0.000 | 0.000 | 74.200 | 97.600 |

Total lipemia

The lipemia was determined by the modified Bloor method. The lipemic drop was calculated by the formula set out above.

The values of total lipemia expressed in mg./100 ml. of plasma for a dose of 100 mg. are the following

|  | Controls | Triton | Heparin | Ateroid |
|---|---|---|---|---|
| Total lipid mg./100 ml | 460 | 1,900 | 800 | 655 |
| Percent total lipid | 100 | 413 | 174 | 142 |
| Percent lipid drop relative to control | | 0 | 76.4 | 86.4 |

Anticholesterolemic activity

Ateroid administered intraperitoneally to albino rats under the above-described conditions, brought about, besides the drop in lipids, a substantial reduction of total and esterified cholesterol determined by the method of Liebermann and Bouchard.

The calculation of the percent drop is effected as for the lipids according to the formula set out above.

A substantial change in the cholesterol level is observed be it free or esterified:

|  | Controls | Triton 200 mg./kg. | Heparin 100 mg./kg. | Ateroid 100 mg./kg. |
|---|---|---|---|---|
| Total cholesterol mg./100 ml | 45 | 150 | 91 | 74 |
| Total cholesterol percent | 100 | 333 | 202 | 164 |
| Total cholesterol drop relative to control | | 0 | 56.2 | 72.4 |
| Esterified cholesterol mg./100 ml | 32 | 105 | 58 | 61 |
| Percent esterified cholesterol | 100 | 328 | 181 | 191 |
| Esterified cholesterol drop relative to control | | 0 | 64.4 | 60.2 |
| Free cholesterol mg./100 ml | 13 | 45 | 33 | 13 |
| Percent free cholesterol | 100 | 346 | 254 | 100 |
| Free cholesterol drop relative to control | | 0 | 37.5 | 100 |

Clarifying activity

One proof which is considered essential for the demonstration of biological activity of a particular compound which is thought to have clarifying activity is that of clarification induced in the plasma of animals treated with the substance under study in a suitable substrate, in comparison with the plasma of control animals.

Since the clearing action is the consequence of the activation of serous lipases, and more precisely of triglyceridases by the action of heparin, the determination of the lipasemia is a measure of the heparin-like activity of such a substance.

Thus I carried out two experiments: the first by means of intravenous administration and the second by gastric administration by means of a tube in the dose of 10 mg./rat.

Non-fasting albino rats weighing 200 g. were used.

The substrate was Ediol, an intravenous fat emulsion, diluted to 0.25%, 1 ml. of which was combined with 2 ml. plasma.

The data obtained is summarized below.

Intravenous administration 10 mg./rat (blood withdrawal 10 minutes after administration):

| Time | Controls | | Heparin | | Ateroid | |
|---|---|---|---|---|---|---|
|  | O.D.m. | Percent | O.D. | Percent | O.D. | Percent |
| 30'' | 565 | 100 | 605 | 100 | 555 | 100 |
| 15' | 570 | 101 | 280 | 46 | 168 | 30 |
| 30' | 560 | 99 | 192 | 32 | 115 | 21 |
| 45' | 560 | 99 | 170 | 28 | 102 | 18 |
| 60' | 560 | 99 | 160 | 26 | 95 | 17 |

Oral administration 10 mg./rat (blood withdrawal 30 minutes after administration):

| Time | Controls | | Heparin | | Ateroid | |
|---|---|---|---|---|---|---|
|  | O.D.m. | Percent | O.D. | Percent | O.D. | Percent |
| 30'' | 600 | 100 | 597 | 100 | 597 | 100 |
| 60' | 600 | 100 | 560 | 94 | 430 | 72 |
| 120' | 580 | 97 | 520 | 87 | 308 | 52 |
| 240' | 530 | 88 | 465 | 78 | 182 | 31 |

Ateroid is clearly active orally in contradistinction to heparin.

Activity on plasmatic lipoproteins

Together with a marked lipemic and cholesterolemic activity there was also observed a normalizing action on lipoproteidemia, both in its quantitative and qualitative aspects.

Thus, together with a substantial reduction of total lipoproteins, there is present an increase in electrophoretic velocity of beta globulin and a shift towards normal in the alpha/beta globulin relationship.

The electrophoretic runs were followed on paper, adding constant quantities of plasma from the animals treated as previously indicated and then testing the samples for lipoproteins.

Anticoagulant activity

The anticoagulant activity was determined as usual by comparison with heparin using rabbits weighing 2 kg.

The dose of ateriod was 12 mg./kg. while that of heparin was 5–10–20 mg./kg.

The prothrombin time was determined from the moment of administration.

The values set out below are given in percent of the initial prothrombin time, withdrawn before the administration of the preparation:

| Time | Controls | Heparin 5 mg./kg. | Heparin 10 mg./kg. | Heparin 20 mg./kg. | Ateroid 12 mg./kg. |
|---|---|---|---|---|---|
| 0 | 100 | 100 | 100 | 100 | 100 |
| 30' | 102 | 135 | 203 | 300 | 150 |
| 60' | 102 | 130 | 181 | 280 | 141 |
| 120' | 98 | 122 | 152 | 200 | 115 |
| 240' | 101 | 81 | 111 | 156 | 102 |

It may thus be seen that 12 mg. of ateriod have the same anticoagulant activity as 5–6 mg. of heparin.

I claim:

1. A method for the preparation of a heparinoidic factor which comprises the steps of comminuting a mammalian duodenum suspending the comminuted material in water at pH of approximately 8, heating said suspended material for about 15 minutes at a temperature of from about 70–90° C., removing the solid residue after heating, dialysing the filtrate and precipitating said heparinoidic factor in partially purified form from the dialysed filtrate at a pH of about 5 by the addition of a suitable precipitant therefor.

2. A process as claimed in claim 1 in which prior to dialysis the filtrate is subjected to proteolysis by the addition of a protease.

3. The product prepared by the process of claim 2.

References Cited in the file of this patent

Salvetti: Atti della Societa Lombarda Sci. Med. Biol., vol. 10, 1955, pp. 341–342.

Bonvini: Bollettino della Societa Italiana di Biol. Sper., vol. 32, No. 9, September 1956, pp. 988–990.

Prusoff: Blood, vol. 8, No. 6, June 1953, pp. 491–493.